(12) United States Patent
Kobayashi

(10) Patent No.: US 7,616,354 B2
(45) Date of Patent: Nov. 10, 2009

(54) IMAGE CAPTURE APPARATUS CONFIGURED TO DIVISIONALLY READ OUT ACCUMULATED CHARGES WITH A PLURALITY OF FIELDS USING INTERLACED SCANNING

(75) Inventor: Taro Kobayashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1038 days.

(21) Appl. No.: 11/092,115

(22) Filed: Mar. 29, 2005

(65) Prior Publication Data

US 2005/0225657 A1 Oct. 13, 2005

(30) Foreign Application Priority Data

Apr. 8, 2004 (JP) ............... 2004-114648

(51) Int. Cl.
*H04N 1/04* (2006.01)
(52) U.S. Cl. .............................. 358/474; 358/482
(58) Field of Classification Search ................ 358/482, 358/483, 505, 513, 400, 404; 348/230.1, 348/303, 304, 305, 318, 320, 322
See application file for complete search history.

(56) References Cited

U.S. PATENT DOCUMENTS

| | | | | |
|---|---|---|---|---|
| 4,054,915 A | * | 10/1977 | Sugihara | 348/283 |
| 4,151,553 A | * | 4/1979 | Sugihara | 348/282 |
| 4,320,413 A | * | 3/1982 | Takemura | 348/314 |
| 4,658,287 A | * | 4/1987 | Chen | 348/281 |
| 7,154,539 B1 | * | 12/2006 | Nishimura et al. | 348/220.1 |
| 2005/0068426 A1 | * | 3/2005 | Kawasaki et al. | 348/222.1 |
| 2005/0168610 A1 | * | 8/2005 | Kobayashi | 348/320 |
| 2005/0179798 A1 | * | 8/2005 | Yamada | 348/311 |
| 2006/0113458 A1 | * | 6/2006 | Yang et al. | 250/208.1 |

FOREIGN PATENT DOCUMENTS

| | | |
|---|---|---|
| JP | 5-007336 A | 1/1993 |
| JP | 7-203320 A | 8/1995 |

* cited by examiner

*Primary Examiner*—Jerome Grant, II
(74) *Attorney, Agent, or Firm*—Canon USA Inc IP Div

(57) ABSTRACT

An image capture apparatus includes an image sensor having a plurality of photoelectric conversion elements that are two-dimensionally arrayed, and a readout portion configured to divisionally read out signals from the plurality of photoelectric conversion elements of the image sensor with a plurality of fields using interlaced scanning. The plurality of fields include a first field in which signals from the plurality of photoelectric conversion elements are read out without being subjected to addition and a second field in which signals from the plurality of photoelectric conversion elements are read out while being subjected to addition. The readout portion reads out at least first, second, and third color signals in each of the first and second fields.

13 Claims, 7 Drawing Sheets

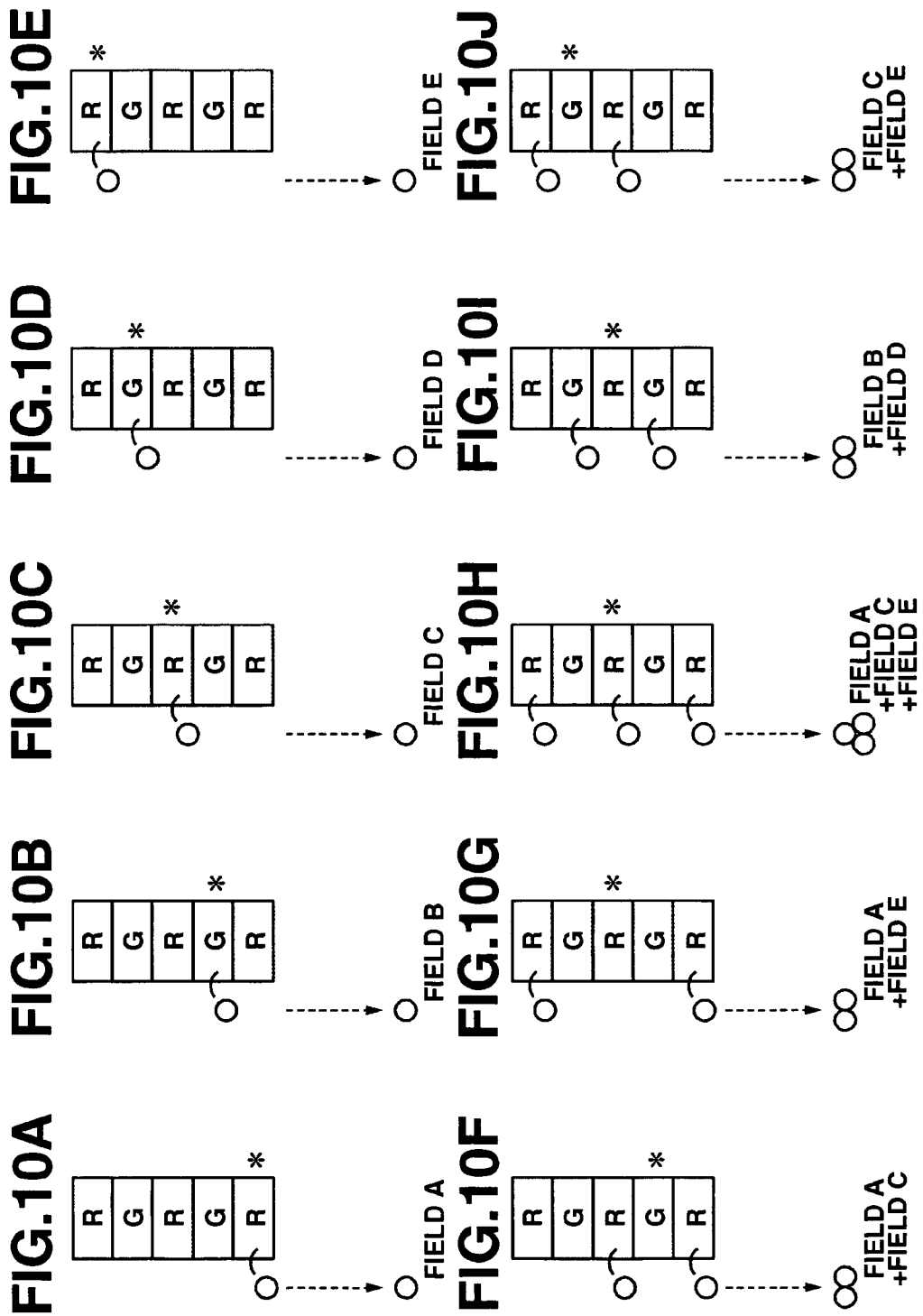

IMAGE CAPTURE APPARATUS CONFIGURED TO DIVISIONALLY READ OUT ACCUMULATED CHARGES WITH A PLURALITY OF FIELDS USING INTERLACED SCANNING

BACKGROUND OF THE INVENTION

1. Field of the Invention

The present invention relates to an image capture apparatus for capturing an object image.

2. Description of the Related Art

Recently, a variety of digital cameras configured to capture a still image or moving image using a solid-state image sensor, such as a CCD (charge-coupled device), have been developed. However, the dynamic range of the solid-state image sensor is low compared to silver-halide film or the like. Accordingly, such digital cameras may produce degraded image quality depending on shooting conditions.

Therefore, in order to capture an image with a high dynamic range exceeding the dynamic range of the solid-state image sensor, a method of using a plurality of images having different luminance values and merging them together to maintain gradation without making any bright or dark image portion crashed or blurred has come into popular use.

In one example of this method, a plurality of pictures that have been sequentially captured at different time points are combined, as disclosed in Japanese Laid-Open Patent Application No. 5-007336.

In another example, a plurality of pictures having different luminance values are obtained using a plurality of image sensors having different sensitivity characteristics and are merged together to create a high-dynamic range image, as disclosed in Japanese Laid-Open Patent Application No. 7-203320.

However, in an image capture apparatus disclosed in Japanese Laid-Open Patent Application No. 5-007336, a plurality of pictures that have been captured at different exposures inevitably involve a time difference, so that an accurate composite image cannot be obtained. In addition, shooting a plurality of times takes time to complete.

In an image capture apparatus disclosed in Japanese Laid-Open Patent Application No. 7-203320, since a plurality of image sensors are used, the size or cost of the image sensors imposes a heavy burden on the image capture apparatus.

SUMMARY OF THE INVENTION

In one aspect of the present invention, an image capture apparatus includes an image sensor having a plurality of photoelectric conversion elements that are two-dimensionally arrayed, and a readout portion configured to divisionally read out signals from the plurality of photoelectric conversion elements of the image sensor with a plurality of fields using interlaced scanning, wherein the plurality of fields include a first field in which signals from the plurality of photoelectric conversion elements are read out without being subjected to addition and a second field in which signals from the plurality of photoelectric conversion elements are read out while being subjected to addition, and wherein the readout portion reads out at least first, second and third color signals in each of the first and second fields.

In another aspect of the present invention, an image capture apparatus includes an image sensor having a plurality of photoelectric conversion elements that are two-dimensionally arrayed, and a readout portion configured to divisionally read out signals from the plurality of photoelectric conversion elements of the image sensor with a plurality of fields using interlaced scanning, wherein the plurality of fields include first and second fields having respective different numbers of signals from the plurality of photoelectric conversion elements that are used for addition, and wherein the readout portion reads out at least first, second and third color signals in each of the first and second fields.

In a further aspect of the present invention, a driving method for an image sensor having a plurality of photoelectric conversion elements that are two-dimensionally arrayed includes divisionally reading out signals from the plurality of photoelectric conversion elements of the image sensor with a plurality of fields using interlaced scanning, wherein the plurality of fields include a first field in which signals from the plurality of photoelectric conversion elements are read out without being subjected to addition and a second field in which signals from the plurality of photoelectric conversion elements are read out while being subjected to addition, and wherein divisionally reading out signals from the plurality of photoelectric conversion elements of the image sensor includes reading out at least first, second and third color signals in each of the first and second fields.

In a still further aspect of the present invention, a driving method for an image sensor having a plurality of photoelectric conversion elements that are two-dimensionally arrayed includes divisionally reading out signals from the plurality of photoelectric conversion elements of the image sensor with a plurality of fields using interlaced scanning, wherein the plurality of fields include first and second fields having respective different numbers of signals from the plurality of photoelectric conversion elements that are used for addition, and wherein divisionally reading out signals from the plurality of photoelectric conversion elements of the image sensor includes reading out at least first, second and third color signals in each of the first and second fields.

Other features and advantages of the present invention will become apparent to those skilled in the art upon reading of the following detailed description of embodiments thereof when taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 10A to 10J are diagrams schematically illustrating various types of readout methods according to the embodiment.

DETAILED DESCRIPTION OF THE EMBODIMENTS

Embodiments of the invention will be described in detail below with reference to the drawings.

Figure 1:
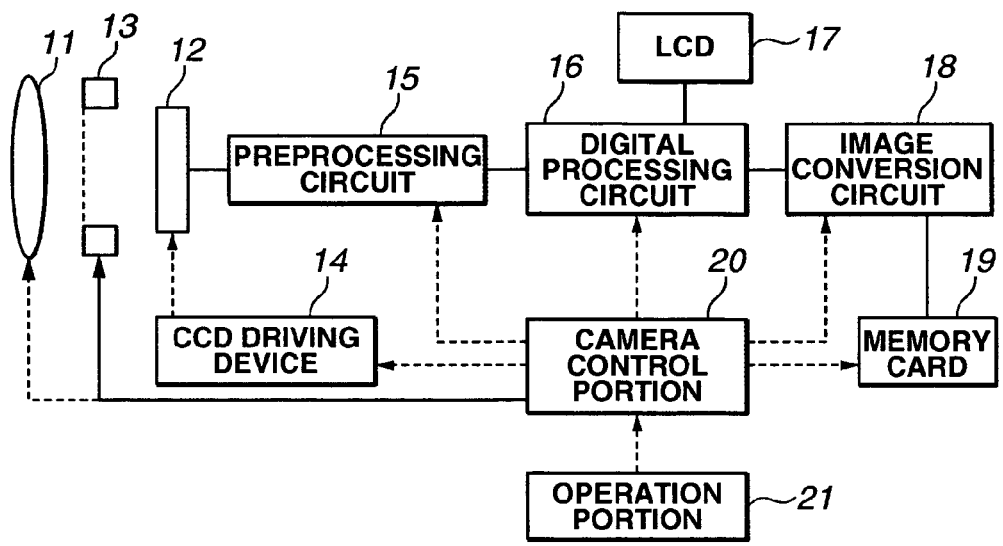
FIG. 1 is a block diagram schematically showing components of a digital camera according to an exemplary embodiment of the invention.

FIG. 1 is a block diagram schematically showing components of a digital camera according to an exemplary embodiment of the invention. The digital camera includes an optical system 11, a CCD 12, a mechanical shutter 13, a CCD driving device 14, a preprocessing circuit 15, a digital processing circuit 16, a liquid crystal display (LCD) device 17, an image conversion circuit 18, a memory card 19, a camera control portion 20 and an operation portion 21. The optical system 11 includes a lens, etc., and forms an object image on a light-sensitive surface of the CCD 12. The CCD 12 is an image sensor configured to photoelectrically convert a light signal generated from the object image formed on the light-sensitive surface thereof to produce an electrical signal. The mechanical shutter 13 is disposed between the optical system 11 and the CCD 12. When the mechanical shutter 13 is closed, light falling on the CCD 12 is blocked.

The CCD driving device 14 generates timing pulses for driving the CCD 12. The preprocessing circuit 15 includes a sample-and-hold (S/H) circuit, a gain amplifier and an analog-to-digital (A/D) converter and digitizes the output of the CCD 12, which is driven by the CCD driving device 14. The output of the preprocessing circuit 15 is supplied to the digital processing circuit 16. The digital processing circuit 16 performs various digital signal processing operations including gamma processing, color signal processing, expanded-dynamic range image processing, etc. The output of the digital processing circuit 16 is supplied to the image conversion circuit 18 and can also be supplied to the LCD device 17.

The image conversion circuit 18 compresses image data subjected to image processing by the digital processing circuit 16 and writes the compressed image data onto the memory card 19 for recording. The image conversion circuit 18 has both the function of compressing image data from the digital processing circuit 16 and outputting the compressed image data to the memory card 19 and the function of decompressing image data read from the memory card 19 and outputting the decompressed image data to the digital processing circuit 16.

The camera control portion 20 controls the optical system 11, the mechanical shutter 13, the CCD driving device 14, the preprocessing circuit 15, the digital processing circuit 16, the image conversion circuit 18 and the memory card 19. The operation portion 21 has various functions including releasing the shutter, changing the size of an output image, changing readout modes, etc., and is connected to the camera control portion 20. The function of changing readout modes enables a user of the digital camera to select one of a normal readout mode not involving pixel addition and a special readout mode involving pixel addition. Thus, in a single image capture apparatus, both the normal readout mode not involving pixel addition and the special readout mode involving pixel addition can be selectively implemented.

Figure 2:
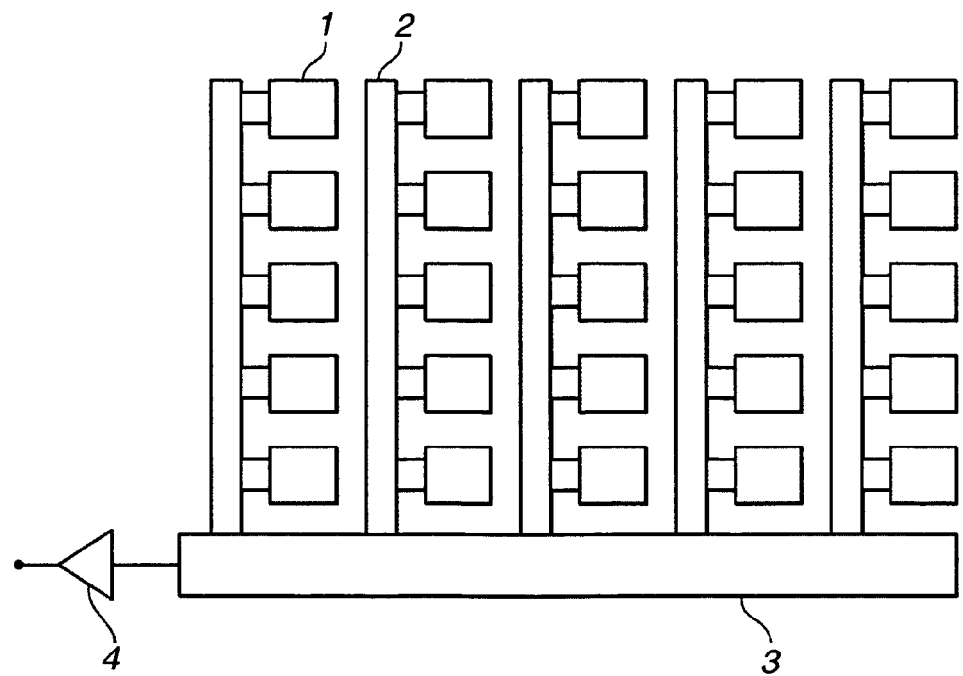
FIG. 2 is a diagram schematically illustrating the structure of an interline CCD (charge-coupled device) used for the digital camera according to the embodiment.

FIG. 2 is a diagram schematically illustrating the structure of an interline CCD used for the digital camera according to the present embodiment. The CCD 12 shown in FIG. 2 is an interline solid-state image sensor and includes a plurality of photoelectric conversion elements (pixels) 1, a plurality of vertical transfer portions (VCCDs) 2, a horizontal transfer portion (HCCD) 3 and an output amplifier portion 4. The photoelectric conversion elements (pixels) 1 are arrayed in a matrix manner and convert incident light into electric charges. The vertical transfer portions 2 read out signal charges accumulated in the pixels 1 and transfer the read charges in the vertical direction. The horizontal transfer portion 3 transfers, in the horizontal direction, signal charges for one line transferred from the vertical transfer portions 2. The output amplifier portion 4 converts signal charges transferred from the horizontal transfer portion 3 into an electrical signal.

The digital camera according to the present embodiment operates as described below when capturing a still image. The mechanical shutter 13 is closed after a predetermined exposure period following a shutter release operation, and an amount of electric charge corresponding to the quantity of incident light from an object is accumulated at each pixel 1. After that, the charges accumulated in the pixels 1 are read out to the vertical transfer portions 2 while being divided into m fields (m being a natural number equal to or greater than 3). Then, the charges are transferred via the vertical transfer portions 2 and the horizontal transfer portion 3. In the case of interlaced readout, all of the pixels 1 are generally read with two fields by sending all of the odd-numbered lines to the first field and all of the even-numbered lines to the second field. However, in recent years, readout with three or more fields has been developed.

Figure 3:
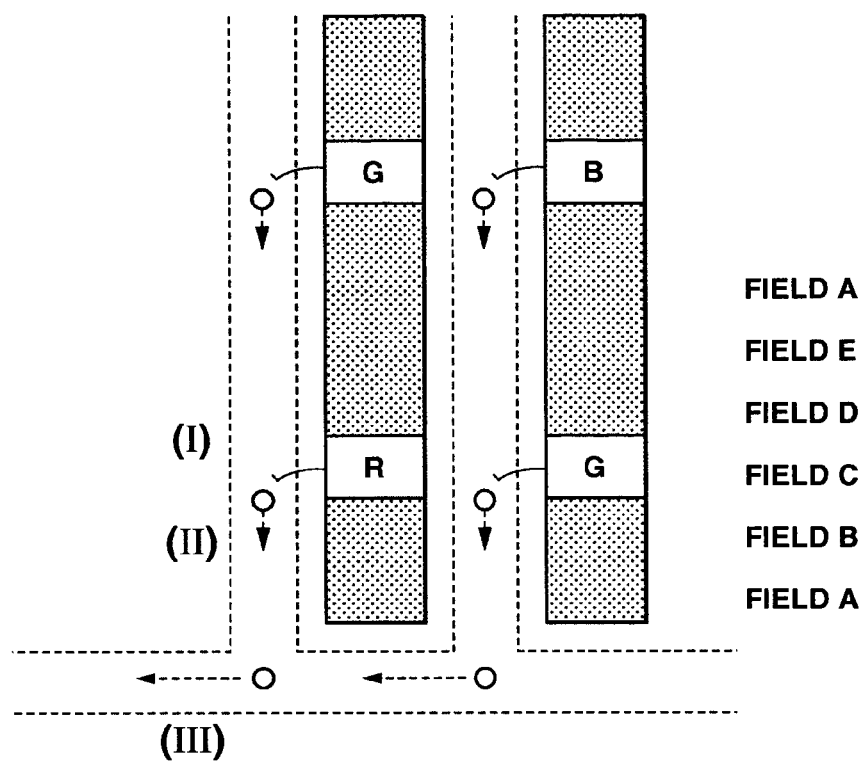
FIG. 3 is a diagram illustrating a part of a pixel array of the CCD according to the embodiment.

FIG. 3 illustrates, by way of example, a part of a pixel array of the CCD 12 according to the embodiment. In this example, the pixel array comprises pixels of 3200 columns (H) ×2400 rows (V), and readout is performed using five fields (m=5). A color filter array comprises RG lines in which a red (R) filter and a green (G) filter are alternately arranged in the horizontal direction and GB lines in which a green (G) filter and a blue (B) filter are alternately arranged in the horizontal direction. This color filter array is known as the Bayer-array.

A readout mode in which a given number n of fields (n being a natural number satisfying n≦m) are read out among five fields A to E and at least one of the n fields is subjected to pixel addition is now described below with reference to FIGS. 3 to 6, taking reading of two fields (n=2) as an example.

Figure 4:
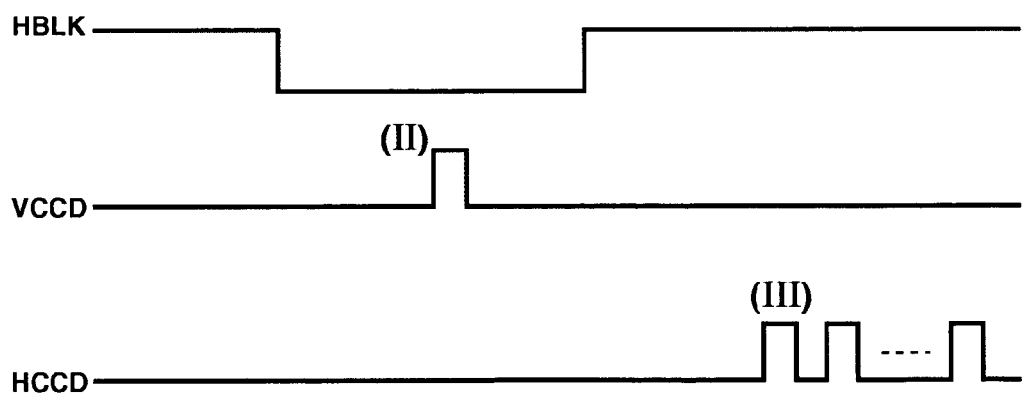
FIG. 4 is a timing chart schematically illustrating timing pulses produced for reading a first field according to the embodiment.

Reading of the first field is described first. This reading is the same as reading performed when all of the pixels are read out, and is a normal readout method not involving pixel addition. FIG. 4 schematically illustrates timing pulses of driving voltages for charge transfer that are applied to the transfer gate electrodes of the vertical transfer portions (VCCDs) 2 and the horizontal transfer portion (HCCD) 3 during and after a horizontal blanking period (HBLK). These timing pulses are supplied from the CCD driving device 14 to drive the CCD 12.

When a high-speed sweep period ends after the mechanical shutter 13 is closed, signal charges from pixels for the field C are first read out to the vertical transfer portions 2 (step I).

After that, within a horizontal blanking period, pulse voltages are applied to the transfer gate electrodes of the vertical transfer portions 2 to drive the vertical transfer portions 2 by one stage or a plurality of stages. By this driving, charges read from pixels on one line arranged closest to the horizontal transfer portion 3 are transferred to the horizontal transfer portion 3 (step II).

Then, within an effective period coming after the end of the horizontal blanking period, many pulse voltages are applied to the gate electrode of the horizontal transfer portion 3 to drive the horizontal transfer portion 3 by 3200 stages. By this driving, the charges on the horizontal transfer portion 3 are transferred to the output amplifier 4 and are then output therefrom (step III).

The above-described readout operation is repeated for 480 horizontal blanking periods, which correspond to one field period. Accordingly, reading of 3200×480 accumulated charges is completed, so that all of the signal charges from pixels of the first field are read out.

Figure 5:
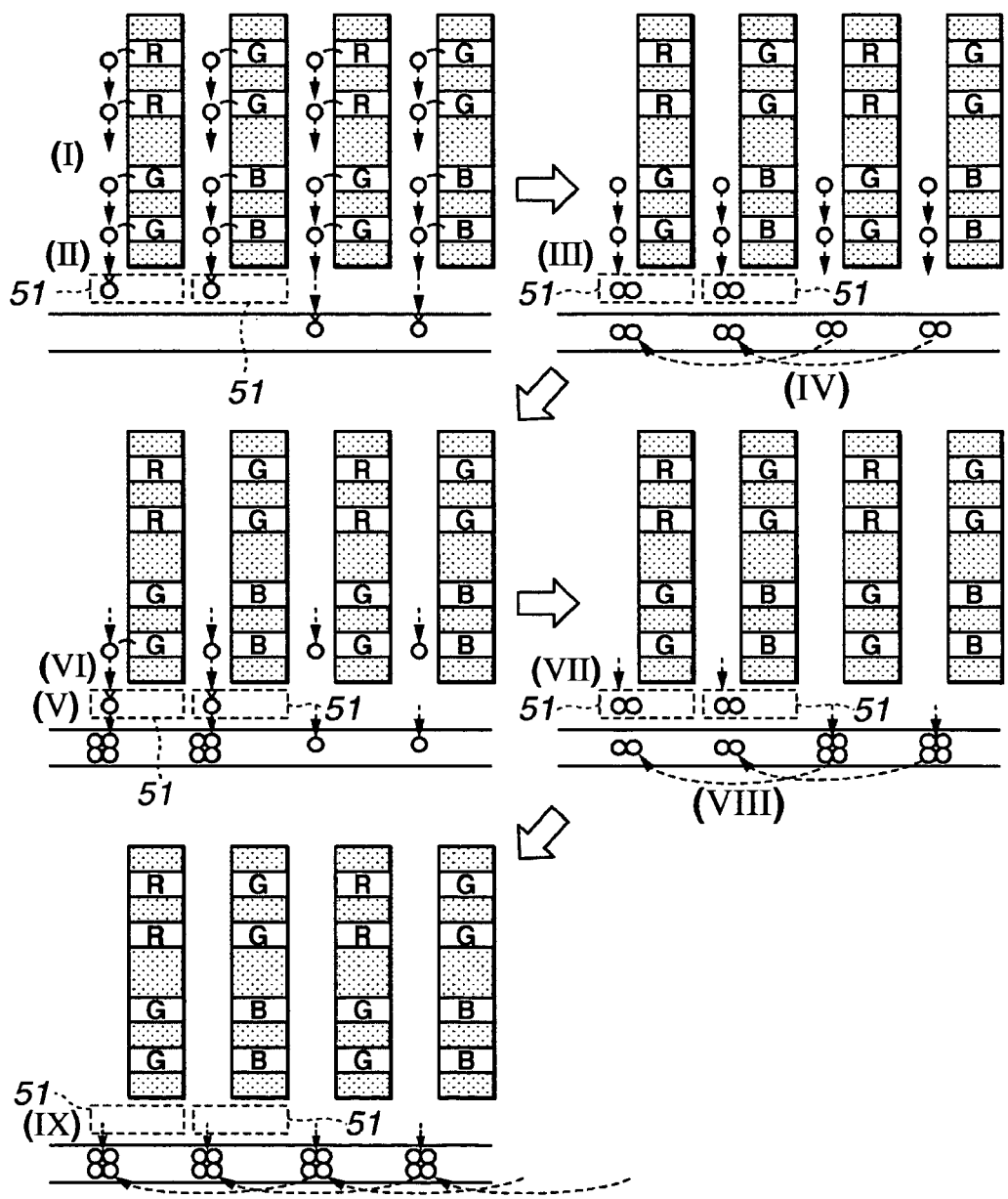
FIG. 5 is a diagram illustrating a part of a pixel array according to the embodiment.
Figure 6:
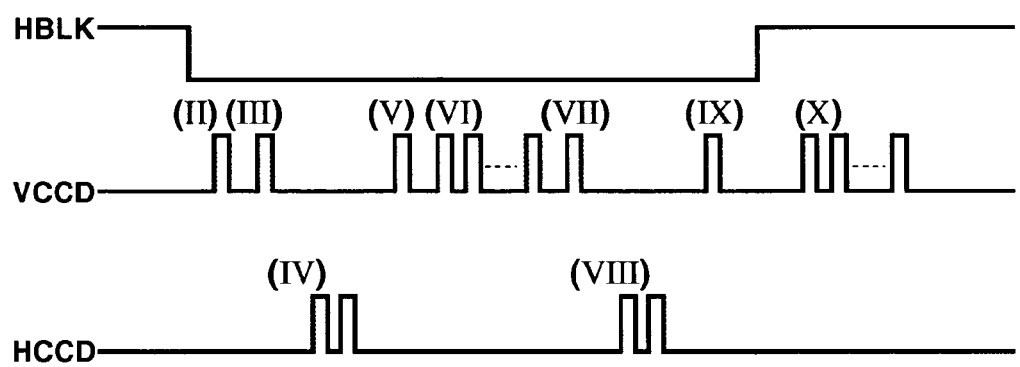
FIG. 6 is a timing chart schematically illustrating timing pulses produced for reading a second field according to the embodiment.

Reading of the second field is described next. FIGS. 5 and 6 schematically illustrate a part of a pixel array and timing pulses, respectively, similar to FIGS. 3 and 4. As shown in FIG. 5, in the vertical transfer portions 2, two neighboring columns, each including an accumulation area 51 and two neighboring columns including no accumulation area are alternately arranged.

When a high-speed sweep period ends after the mechanical shutter 13 is closed, signal charges from pixels for the fields B and C are first read out to the vertical transfer portions 2 (step I).

After that, within a horizontal blanking period, pulse voltages are applied to the transfer gate electrodes of the vertical transfer portions 2 to drive the vertical transfer portions 2 by one stage or a plurality of stages. By this driving, charges read from pixels on one line arranged closest to the horizontal transfer portion 3 are transferred to the horizontal transfer portion 3 in the case of each column including no accumulation area and to the accumulation areas 51 in the case of each column including the accumulation area 51 (step II).

Then, while the state of the horizontal transfer portion 3 is kept unchanged, pulse voltages are further applied to the transfer gate electrodes of the vertical transfer portions 2 to drive the vertical transfer portions 2. By this driving, charges read from one line adjacent to the line subjected to charge transfer in the step II are mixed with the charges already transferred to the accumulation areas 51 and the horizontal transfer portion 3 (vertical addition) (step III).

Then, two pulse voltages are applied to the transfer gate electrode of the horizontal transfer portion 3, so that charges stored in the horizontal transfer portion 3 are transferred in the horizontal direction by two stages (step IV).

Subsequently, pulse voltages are applied to the transfer gate electrodes of the vertical transfer portions 2 to drive the vertical transfer portions 2 by one stage. By this driving, charges stored in the accumulation areas 51 are mixed with charges stored in the horizontal transfer portion 3 (horizontal addition) (step V).

Then, charges read from pixels on one line arranged close to the horizontal transfer portion 3 are transferred to the horizontal transfer portion 3 in the case of each column including no accumulation area and to the accumulation areas 51 in the case of each column including the accumulation area 51 (step VI).

After that, while the state of the horizontal transfer portion 3 is kept unchanged, pulse voltages are further applied to the transfer gate electrodes of the vertical transfer portions 2 to drive the vertical transfer portions 2. By this driving, charges read from one line adjacent to the line subjected to charge transfer in the step VI are mixed with the charges already transferred to the accumulation areas 51 and the horizontal transfer portion 3 (vertical transfer) (step VII).

Then, two pulse voltages are applied to the transfer gate electrode of the horizontal transfer portion 3, so that charges stored in the horizontal transfer portion 3 are transferred in the horizontal direction by two stages (step VIII).

Subsequently, pulse voltages are applied to the transfer gate electrodes of the vertical transfer portions 2 to drive the vertical transfer portions 2 by one stage. By this driving, charges stored in the accumulation areas 51 are mixed with charges stored in the horizontal transfer portion 3 (horizontal addition) (step IX).

According to processing as thus far described, signal charges for two lines are converted into signal charges for one line in a horizontally added state.

Then, within an effective period coming after the end of the horizontal blanking period, many pulse voltages are applied to the gate electrode of the horizontal transfer portion 3 to drive the horizontal transfer portion 3 by 3200 stages. By this driving, the charges on the horizontal transfer portion 3 are transferred to the output amplifier 4 and are then output therefrom (step X). Accordingly, signal charges for two lines that have been subjected to vertical addition and horizontal addition are read out within one horizontal period.

The above-described readout operation is repeated for 240 horizontal blanking periods, which correspond to one-half of one field period. Accordingly, reading of 1600×2×240 accumulated charges is completed. Thus, signal charges from pixels of the fields B and D are read out with the number of signal charges in the horizontal direction halved by horizontal addition and at double the speed. In addition, since signal charges from four pixels neighboring in the horizontal and vertical directions are added together, the second field provides a sensitivity value that is about four times that of the first field.

While only one of horizontal addition and vertical addition may be employed, using both horizontal addition and vertical addition enables an image involving larger luminance level differences to be captured.

Pixel charges read out as described above are processed by the digital processing circuit 16 via the preprocessing circuit 15. According to this processing, two fields that have different luminance levels, while being obtained from the same exposure, are combined to obtain a wide-dynamic range image.

The details of processing for dynamic range expansion performed by the digital processing circuit 16 are now described below. The digital processing circuit 16 first performs interpolation processing and, after that, performs dynamic range expansion processing.

The interpolation processing is described first. Since R and B components cannot be obtained from a signal from a G pixel, the R and B components are compensated for through interpolation using a signal from an adjacent R pixel and a signal from an adjacent B pixel. Similarly, since G and B components cannot be obtained from a signal from an R pixel, the G and B components are compensated for through interpolation using a signal from an adjacent G pixel and a signal from an adjacent B pixel. Similarly, since G and R components cannot be obtained from a signal from a B pixel, the G and R components are compensated for through interpolation using a signal from an adjacent G pixel and a signal from an adjacent R pixel.

Figure 7:
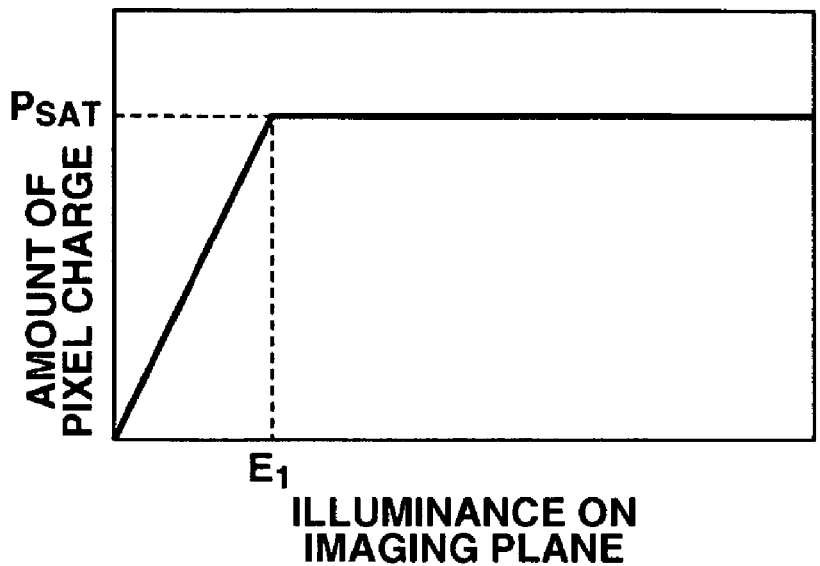
FIG. 7 is a diagram illustrating expanding a dynamic range.
Figure 8:
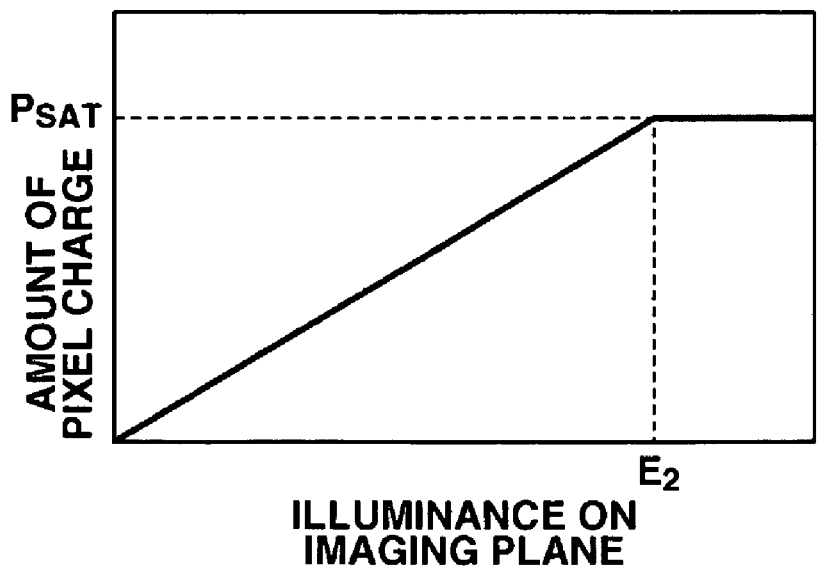
FIG. 8 is a diagram illustrating expanding a dynamic range.

The dynamic range expansion processing is described next. FIG. 7 is a diagram illustrating characteristics of the level of a signal obtained by adding together signals from four pixels relative to the illuminance (brightness) of an imaging plane. FIG. 8 is a diagram illustrating characteristics of the level of a signal obtained from one pixel without pixel addition relative to the illuminance (brightness) of an imaging plane. In FIGS. 7 and 8, $P_{SAT}$ represents the saturation level of an amount of pixel charge processed by the A/D converter. The A/D converter digitizes pixel charge into a 10-bit signal. $P_{SAT}$ is the maximum level that can be represented with 10 bits. Signals are processed with 10-bit operation even after A/D conversion. As shown in FIGS. 7 and 8, a signal obtained by adding together signals from four pixels is saturated when the signal reaches an illuminance level $E_1$. A signal obtained from one pixel without pixel addition is saturated when the signal reaches an illuminance level $E_2$ ($E_1 < E_2$).

Figure 9:
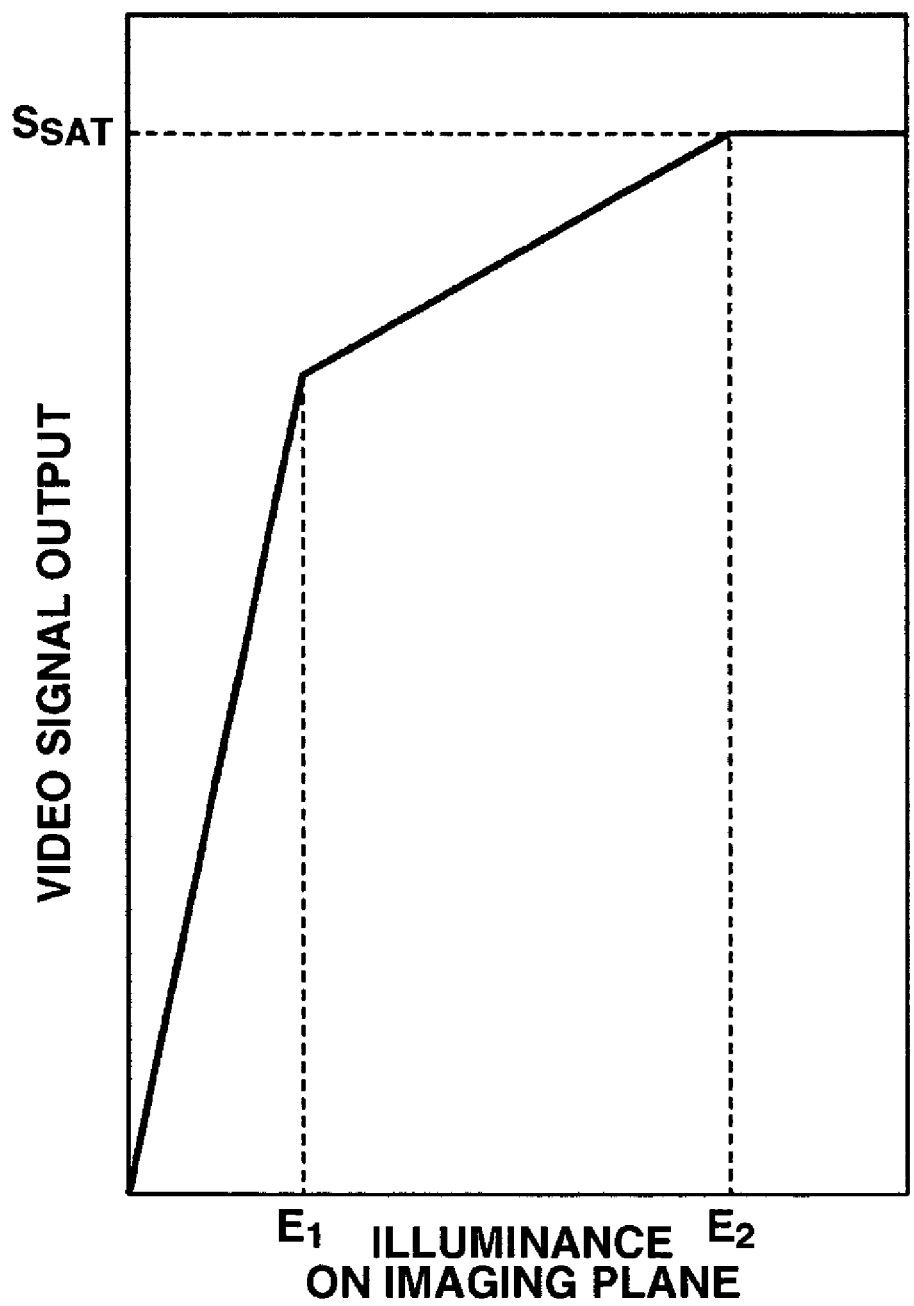
FIG. 9 is a diagram illustrating expanding a dynamic range.

FIG. 9 is a diagram illustrating characteristics of the level of a signal obtained by adding together a signal having one-half of the level of a signal obtained by adding together signals from four pixels and a signal having one-half of the level of a signal obtained from one pixel without pixel addition, relative to the illuminance (brightness) of an imaging plane. As shown in FIG. 9, the dynamic range is expanded.

Thus, expanding the dynamic range is attained by adding together a value obtained by dividing the value of a signal obtained by adding together signals from four pixels by 2 and a value obtained by diving the value of a signal obtained from one pixel without pixel addition by 2.

As described above, using a mode for reading out a plurality of field images having respective different luminance levels enables an image having a wider dynamic range than the dynamic range of the image sensor itself to be obtained although the number of obtainable pixels decreases.

As shown in FIGS. 10A to 10J, ten types of readout methods can be used in the 5-field image sensor according to the present embodiment. Here, only the case where pixels of the same color of the Bayer-array image sensor are vertically added is taken into consideration. If the readout methods shown in FIGS. 10G and 10I, for example, are compared with each other, it is found that the median positions (*) of these readout methods coincide with each other. In cases where the median positions (*) of fields coincide with each other, any interpolation process for matching barycenters at the time of merging field images is unnecessary, so that a still image can be readily generated.

In the above-described embodiment, a readout method shown in FIG. 10C is performed in the first field, and a readout method shown in FIG. 10I is performed in the second field. However, the readout method shown in FIG. 10I may be performed in the first field, and a readout method shown in FIG. 10H may be performed in the second field.

The present invention can also be achieved by providing a system or apparatus with a storage medium that stores a program code of software for implementing the functions of the above-described embodiment, and causing a computer (or a CPU, MPU or the like) of the system or apparatus to read the program code from the storage medium and then to execute the program code.

In this case, the program code itself read from the storage medium implements the functions of the embodiment, and a storage medium storing the program code and a program containing the program code each constitute the invention. The storage medium for providing the program code includes, for example, a floppy disk, a hard disk, an optical disk, a magneto-optical disk, a CD-ROM, a CD-R, a magnetic tape, a non-volatile memory card, a ROM, etc.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2004-114648 filed Apr. 8, 2004, which is hereby incorporated by reference herein.

What is claimed is:

1. An image capture apparatus comprising:
   an image sensor having a plurality of photoelectric conversion elements that are two-dimensionally arrayed; and
   a readout portion configured to divisionally read out signals from the plurality of photoelectric conversion elements of the image sensor with a plurality of fields using interlaced scanning,
   wherein the plurality of fields include a first field in which signals from the plurality of photoelectric conversion elements are read out without being subjected to addition and a second field in which signals from the plurality of photoelectric conversion elements are read out while being subjected to addition, and
   wherein the readout portion reads out at least first, second, and third color signals in each of the first and second fields.

2. An image capture apparatus according to claim 1, wherein a filter for a first color and a filter for a second color are alternately arrayed in a horizontal direction on each of odd-numbered lines of the plurality of photoelectric conversion elements, and a filter for the first color and a filter for a third color are alternately arrayed in the horizontal direction on each of even-numbered lines of the plurality of photoelectric conversion elements, and
   wherein the readout portion divisionally reads out signals from the plurality of photoelectric conversion elements of the image sensor with a plurality of fields using interlaced scanning in units of n lines, n being an odd number equal to or greater than 3.

3. An image capture apparatus according to claim 1, wherein the image sensor includes vertical transfer portions configured to transfer electric charges from the photoelectric conversion elements in a vertical direction, and a horizontal transfer portion configured to transfer electric charges from the vertical transfer portions in a direction intersecting with the vertical direction, and
   wherein the readout portion has at least one of a vertical pixel addition function of adding together signals from the photoelectric conversion elements that are arranged in the vertical direction at the vertical transfer portions and a horizontal pixel addition function of adding together signals from the vertical transfer portions that are arranged in a horizontal direction at the horizontal transfer portion.

4. An image capture apparatus according to claim 1, further comprising an analog-to-digital conversion circuit configured to convert signals for the plurality of fields read from the image sensor into digital signals, and a signal processing portion configured to combine the digital signals for the plurality of fields output from the analog-to-digital conversion circuit to form a video signal.

5. An image capture apparatus according to claim 1, wherein the readout portion reads out signals such that a median position of one of the plurality of fields coincides with a median position of another field.

6. An image capture apparatus comprising:
   an image sensor having a plurality of photoelectric conversion elements that are two-dimensionally arrayed; and
   a readout portion configured to divisionally read out signals from the plurality of photoelectric conversion elements of the image sensor with a plurality of fields using interlaced scanning,
   wherein the plurality of fields include first and second fields having respective different numbers of signals from the plurality of photoelectric conversion elements that are used for addition, and
   wherein the readout portion reads out at least first, second, and third color signals in each of the first and second fields such that a median position of one of the plurality of fields coincides with a median position of another field.

7. An image capture apparatus according to claim 6, wherein a filter for a first color and a filter for a second color are alternately arrayed in a horizontal direction on each of odd-numbered lines of the plurality of photoelectric conversion elements, and a filter for the first color and a filter for a third color are alternately arrayed in the horizontal direction on each of even-numbered lines of the plurality of photoelectric conversion elements, and wherein the readout portion divisionally reads out signals from the plurality of photoelectric conversion elements of the image sensor with a plurality of fields using interlaced scanning in units of n lines, n being an odd number equal to or greater than 3.

8. An image capture apparatus according to claim 6, wherein the image sensor includes vertical transfer portions configured to transfer electric charges from the photoelectric conversion elements in a vertical direction, and a horizontal transfer portion configured to transfer electric charges from the vertical transfer portions in a direction intersecting with the vertical direction, and wherein the readout portion has at least one of a vertical pixel addition function of adding together signals from the photoelectric conversion elements that are arranged in the vertical direction at the vertical transfer portions and a horizontal pixel addition function of adding together signals from the vertical transfer portions that are arranged in a horizontal direction at the horizontal transfer portion.

9. An image capture apparatus according to claim 6, further comprising an analog-to-digital conversion circuit configured to convert signals for the plurality of fields read from the image sensor into digital signals, and a signal processing portion configured to combine the digital signals for the plurality of fields output from the analog-to-digital conversion circuit to form a video signal.

10. A driving method for an image sensor having a plurality of photoelectric conversion elements that are two-dimensionally arrayed, the driving method comprising:

divisionally reading out signals from the plurality of photoelectric conversion elements of the image sensor with a plurality of fields using interlaced scanning, wherein the plurality of fields include a first field in which signals from the plurality of photoelectric conversion elements are read out without being subjected to addition and a second field in which signals from the plurality of photoelectric conversion elements are read out while being subjected to addition, and wherein divisionally reading out signals from the plurality of photoelectric conversion elements of the image sensor comprises reading out at least first, second, and third color signals in each of the first and second fields.

11. Computer-readable medium for storing computer-executable process step for carrying out the method of claim 10.

12. A driving method for an image sensor having a plurality of photoelectric conversion elements that are two-dimensionally arrayed, the driving method comprising:

divisionally reading out signals from the plurality of photoelectric conversion elements of the image sensor with a plurality of fields using interlaced scanning, wherein the plurality of fields include first and second fields having respective different numbers of signals from the plurality of photoelectric conversion elements that are used for addition, and wherein divisionally reading out signals from the plurality of photoelectric conversion elements of the image sensor comprises reading out at least first, second and third color signals in each of the first and second fields such that a median position of one of the plurality of fields coincides with a median position of another field.

13. Computer-readable storage medium for storing computer-executable process steps for carrying out the method of claim 12.

* * * * *